United States Patent [19]

Chao et al.

[11] Patent Number: 4,924,507

[45] Date of Patent: May 8, 1990

[54] REAL-TIME OPTICAL MULTIPLE OBJECT RECOGNITION AND TRACKING SYSTEM AND METHOD

[75] Inventors: Tien-Hsin Chao, Valencia; Hua-Kuang Liu, South Pasadena, both of Calif.

[73] Assignee: The United States of America as represented by the Administrator of the National Aeronautics and Space Administration, Washington, D.C.

[21] Appl. No.: 154,718

[22] Filed: Feb. 11, 1988

[51] Int. Cl.$^5$ ............................................. G06K 9/76
[52] U.S. Cl. ........................................ 382/31; 350/3.6
[58] Field of Search ...................... 382/31, 30, 42, 48; 350/3.6, 3.66, 3.67, 3.72, 3.83, 3.84, 3.85, 3.75; 356/347; 365/125

[56] References Cited

U.S. PATENT DOCUMENTS

| | | | |
|---|---|---|---|
| 3,717,415 | 2/1973 | Woerdman | 356/347 |
| 3,779,492 | 12/1973 | Grumet | 382/31 |
| 3,786,180 | 1/1974 | Macovski | 178/6.5 |
| 4,075,604 | 2/1978 | Degasperi | 340/146.3 |
| 4,303,832 | 12/1981 | Ehrat | 250/556 |
| 4,357,676 | 11/1982 | Brown | 364/822 |
| 4,376,950 | 3/1983 | Brown et al. | 358/90 |
| 4,386,848 | 6/1983 | Clendenin et al. | 356/5 |
| 4,449,144 | 5/1984 | Suzuki | 382/31 |
| 4,462,046 | 7/1984 | Spight | 358/101 |
| 4,556,986 | 12/1985 | Craig | 382/42 |
| 4,573,198 | 2/1986 | Anderson | 382/31 |
| 4,637,056 | 1/1987 | Sherman et al. | 382/31 |
| 4,707,135 | 11/1987 | Swain et al. | 356/347 |
| 4,715,683 | 12/1987 | Gregory et al. | 350/3.66 |
| 4,731,859 | 3/1988 | Holter et al. | 382/31 |
| 4,824,191 | 4/1989 | Kato et al. | 350/3.72 |

OTHER PUBLICATIONS

Guenther et al., "Real Time Optical Vehicle Identification and Trucking", reprinted from Prodoceding of the International a Lasers '78, Dec. 11–15, 1978, pp. 587–594.

Guether et al., *U.S. Army Missle Research and Development Command*, "Hologomlin Optics for Missle Guidance System", Tech. Report T-79-12, Dec. 20, 1978, pp. 1–24.

*Primary Examiner*—Leo H. Boudreau
*Assistant Examiner*—Joseph Mancuso
*Attorney, Agent, or Firm*—Thomas H. Jones; John R. Manning; Charles E. B. Glenn

[57] ABSTRACT

System for optically recognizing and tracking a plurality of objects within a field of vision. Laser (46) produces a coherent beam (48). Beam splitter (24) splits the beam into object (26) and reference (28) beams. Beam expanders (50) and collimators (52) transform the beams (26, 28) into coherent collimated light beams (26', 28'). A two-dimensional SLM (54), disposed in the object beam (26'), modulates the object beam with optical information as a function of signals from a first camera (16) which develops X and Y signals reflecting the contents of its field of vision. A hololens (38), positioned in the object beam (26') subsequent to the modulator (54), focuses the object beam at a plurality of focal points (42). A planar transparency-forming film (32), disposed with the focal points on an exposable surface, forms a multiple position interference filter (62) upon exposure of the surface and development processing of the film (32). A reflector (53) directing the reference beam (28') onto the film (32), exposes the surface, with images focused by the hololens (38), to form interference patterns on the surface. There is apparatus (16', 64) for sensing and indicating light passage through respective ones of the positions of the filter (62), whereby recognition of objects corresponding to respective ones of the positions of the filter (62) is affected. For tracking, apparatus (64) focuses light passing through the filter (62) onto a matrix of CCD's in a second camera (16') to form a two-dimensional display of the recognized objects.

18 Claims, 3 Drawing Sheets

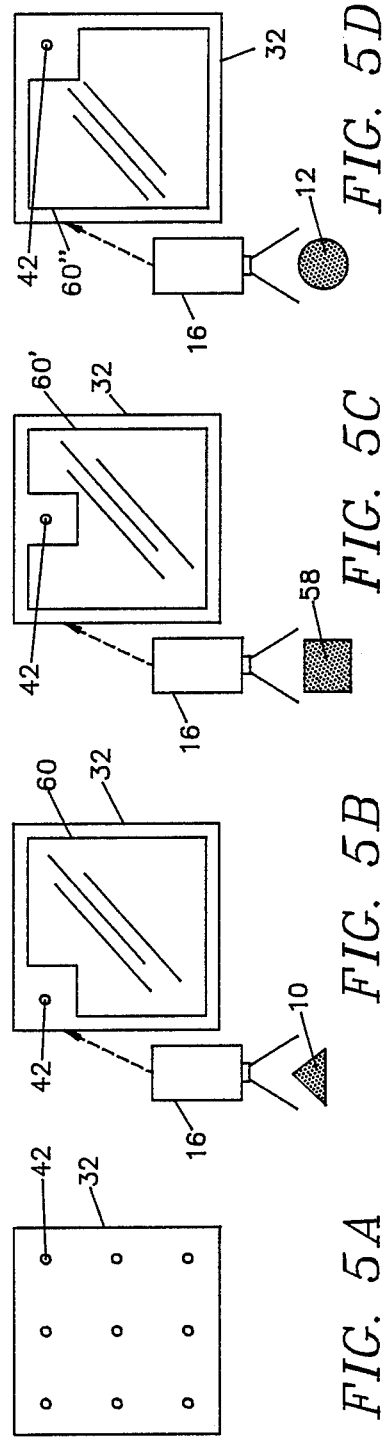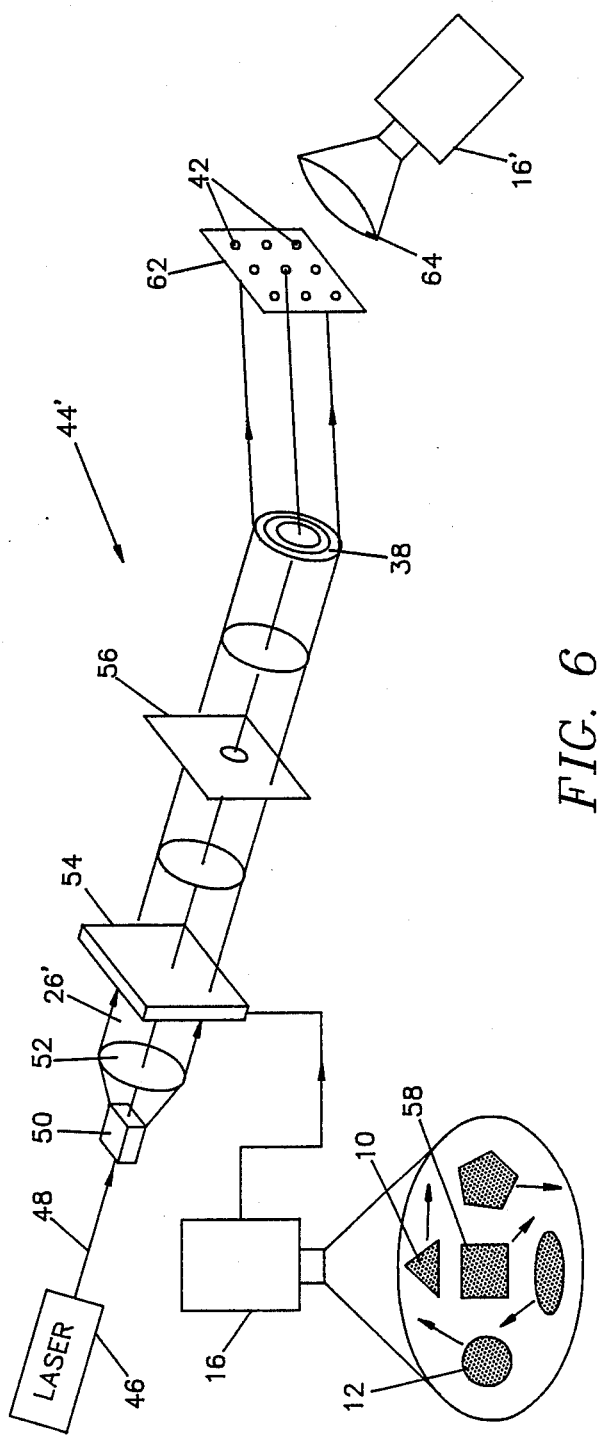

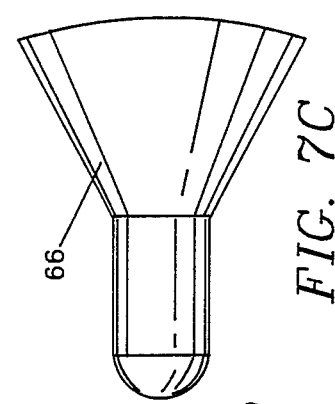
FIG. 7C
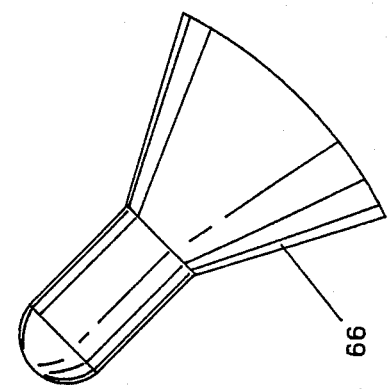
FIG. 7F
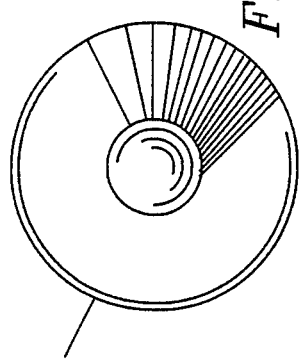
FIG. 7B
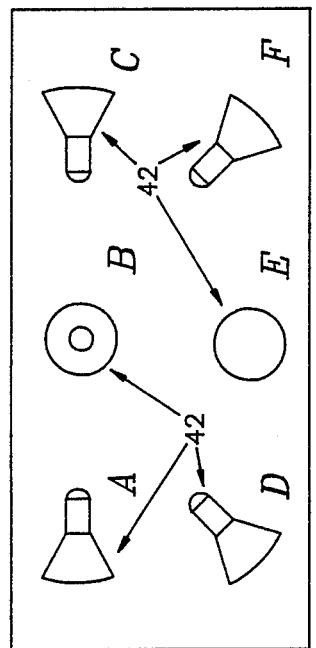
FIG. 7
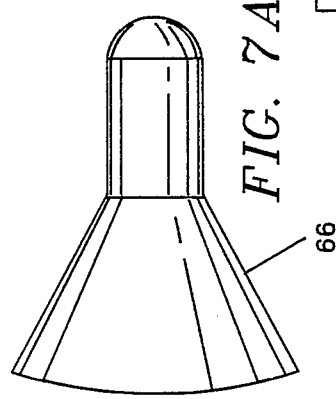
FIG. 7A
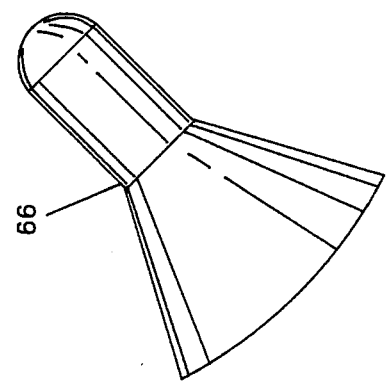
FIG. 7E
FIG. 7D

REAL-TIME OPTICAL MULTIPLE OBJECT RECOGNITION AND TRACKING SYSTEM AND METHOD

ORIGIN OF THE INVENTION

The invention described herein was made in the performance of work under a NASA contract and is subject to the provisions of Public Law 96-517 (35 USC 202) in which the Contractor has elected not to retain title.

TECHNICAL FIELD

The present invention relates to tracking systems and, more particularly, to an optical tracking system for recognizing and tracking multiple objects in real time.

DESCRIPTION OF THE PRIOR ART

Object detection and tracking as accomplished in military command and control systems and air traffic control systems is a straightforward problem that has been accomplished with the combination of radar (for detecting) and digital computers (for tracking). All that is required in such applications is the detection of one or more objects within an area of two-dimensional or three-dimensional space from the radar source.

The combination of object recognition and tracking, however, is another matter. A prior art system for accomplishing such as combination of functions is shown in simplified block diagram form in FIG. 1. Assuming that a triangular shaped object 10 and a circular shaped object 12 are moving within a two-dimensional area 14 they can be recognized and tracked within the area 14 by the components shown in FIG. 1 according to prior art techniques. The area 14 is divided into an M×N matrix of discreetly addressable locations or pixels and viewed by a television camera 16. The information from the television camera 16 relative to the pixel positions within the area 14 is output to a computer 18 on a periodic basis. The period of the output, of course, is established as a function of the speed of movement of the objects 10, 12. For slow-moving objects, the period or sampling rate is long while, on the other hand, for fast-moving objects the sampling rate or period between data output must be short. The computer 18 stores the data from the camera 16 in a memory matrix 20 containing a historical file of the data for the present time (n), the previous time (n−1), etc. The size or number of the historical snapshots is dependent upon the amount of information relative to the object movement that is desired. If only instantaneous relative movement since the last data is required, only a single history of time n−1 is required. If a more detailed tracking profile is required, obviously more data must be retained. In any event, those skilled in the art will appreciate that in order to "recognize" objects 10, 12 employing the digital computer approach of FIG. 1 a detailed programming task must be undertaken relative to the data in each instance. First, the edges of the objects 10, 12, must be located and defined. Having thus established the edge locations, they must then be analyzed to determine whether they are objects to be recognized, i.e. a triangle or a circle. Such a digital approach to object recognition and tracking is computationally intensive, requiring large quantities of time, space, and money to accomplish it. Obviously, objects more complex in shape than a simple triangle or circle intensify the problem.

On the other side of the coin, object recognition using optical techniques is known in the art. As shown in FIG. 2A, a collimated beam of light 22 impressed with a known pattern (e.g. the letter "A") can be split by a beam splitter 24 into an object beam 26 and a reference beam 28. If the object beam 26 is then focused by lens 30 onto a transparent film 32 and, simultaneously, the reference beam 28 is used to illuminate the film 32 after traveling a substantially identical path length to that of the object beam 26, the film 32 will be exposed with an interference pattern of the letter A. If, subsequently, a light beam 22' as shown in FIG. 2B is focused onto the developed film 32' (acting as a spatial filter) and the output, if any, is refocused by a second lens 34, a spot 36 will appear if, and only if, there is correlation between the image impressed on the light beam 22' (in this example another letter A) and the previously established interference pattern on the film 32'. This is known as a Vander Lugt filter, which is well known in the art. With the advent of dynamically modifiable spatial light filter elements such as liquid crystal and magneto-optic filters, the film 32 has been replaced by such devices in tested systems so that object recognition can take place in real-time by driving the dynamic spatial filter with a series of pre-established interference patterns. Unfortunately, there is nothing in the prior art which provides the capability of employing such optical object recognition techniques with the ability to track the objects once recognized.

DISCLOSURE OF THE INVENTION

The present invention has provided an optical recognition and tracking capability by the apparatus for recognizing a plurality of objects within a field of vision comprising, a laser producing a coherent laser beam; a beam splitter disposed to split the laser beam into an object beam and a reference beam; a pair of beam expanders and collimators positioned to transform the object and reference beams into coherent collimated light beams; a two-dimensional spatial light modulator disposed in the object beam to modulate the object beam with optical information as a function of signals connected to X and Y inputs thereof; a television camera for developing X and Y signals reflecting the contents of its field of vision, the X and Y signals being connected to the X and Y inputs of the two-dimensional spatial light modulator; a hololens positioned in the object beam subsequent to the two-dimensional spatial light modulator to focus the object beam at a plurality of focal points; a planar transparency-forming film disposed with the focal points on an exposable surface thereof to form a multiple position interference filter upon exposure of the exposable surface and subsequent development processing of the film; means for directing the reference beam onto the exposable surface of the film to expose the exposable surface in combination with images focused by the hololens to form interference patterns on the exposable surface; and, means for sensing and indicating light passage through respective ones of the positions of the multiple position interference filter following development processing of the exposable surface whereby recognition of objects corresponding to respective ones of the positions of the multiple position interference filter is affected.

In the preferred embodiment, the means for sensing and indicating light passage through respective ones of the positions of the multiple position interference filter includes a second television camera containing a matrix of charge coupled devices and means for focusing light passing through the interference filter onto the matrix.

Additionally in the preferred embodiment, the means for sensing and indicating light passage through respective ones of the positions of the multiple position interference filter employs outputs of the charge coupled devices to indicate light passage at each position of the interference filter and includes means for indicating light passage only if light passing through a position is above a pre-established threshold level corresponding to object recognition.

For tracking of one or more objects, light passing through positions above the pre-established threshold level is focused onto a second television camera to create a two-dimensional image of the field of view of the first television camera and the objects to be tracked therein.

DETAILED DESCRIPTION OF THE DRAWINGS

FIG. 3 is a simplified drawing showing the manner in which a multiple focus hololens produces multiple focal points of the same image.

FIG. 4 is a simplified perspective drawing showing the apparatus employed in the present invention during filter preparation and pre-definition.

FIGS. 5(A)–5(D) comprise a sequence showing how the apparatus of FIG. 4 is employed to create a multiple object spatial filter array according to the present invention.

FIG. 6 shows the manner in which the apparatus of FIG. 4 is configured during real-time recognition and tracking of multiple objects optically employing the spatial filter array constructed according to the method of FIGS. 5(B)–5(D).

FIG. 7 is a drawing showing how the present invention can be employed to recognize the orientation of a spacecraft as the multiple objects of a pre-established filter.

FIGS. 7A–7F are detailed drawings of the orientations of corresponding positions "A" through "F" of FIG. 7.

DETAILED DESCRIPTION OF THE INVENTION

One of the most important potential applications of optical processing in addition to pattern recognition is object tracking. In recent years, the rapid development of various spatial light modulators such as the liquid crystal light cell, the magneto-optic spatial light modulator, the micro-channel spatial light modulator, and the liquid crystal television spatial light modulator (LCTVSLM) has expedited progress in the development of system architectures for real-time optical pattern recognition and tracking. To date, however, only a real-time optical tracking system capable of tracking a single object has been demonstrated in the prior art.

Figure 1:
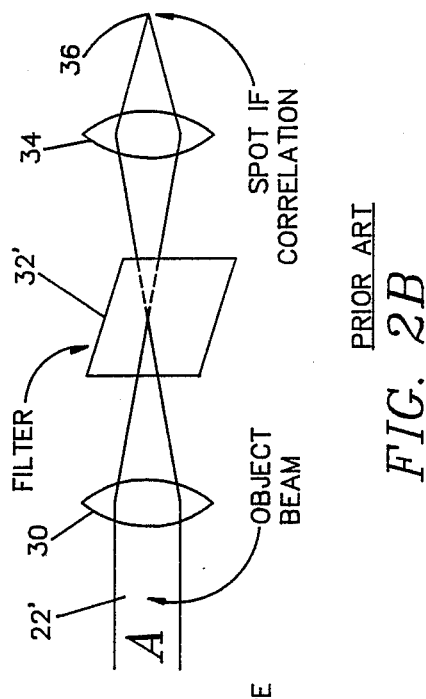
FIG. 1 is a simplified drawing showing a prior art approach to using a digital computer and television camera to recognize and track objects.
Figure 2A:
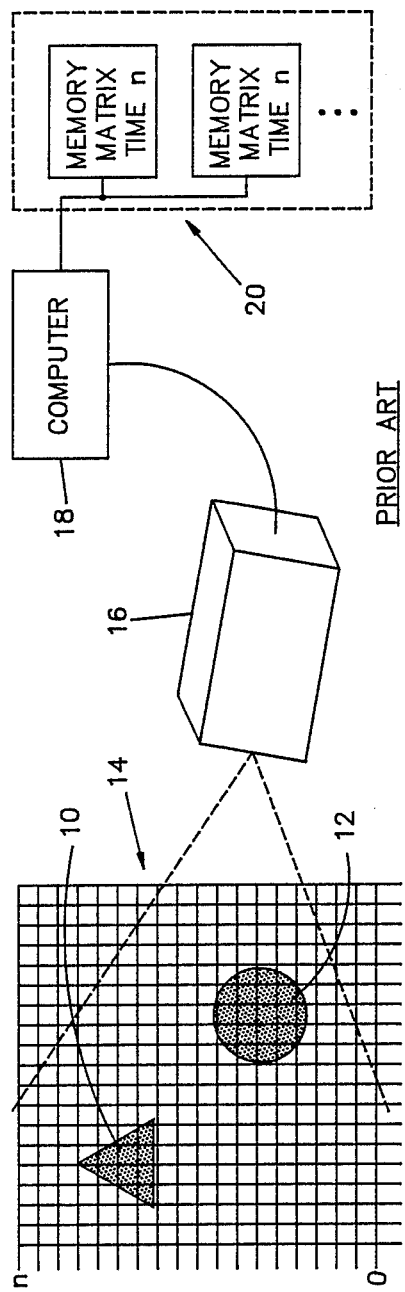
FIG. 2A is a simplified drawing showing the prior art technique of creating a Vander Lugt filter to be used in object recognition.
Figure 2B:
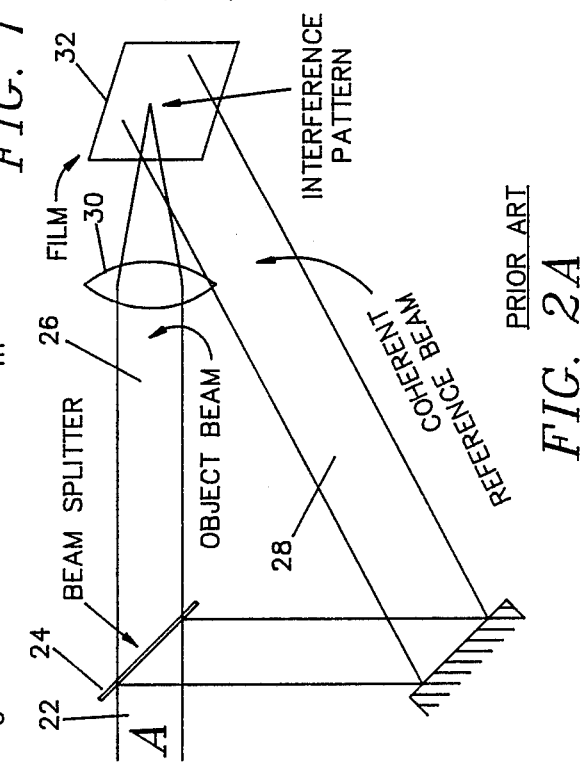
FIG. 2B shows the way that the Vander Lugt filter of FIG. 2A is employed to recognize an object optically.

In 1982 and 1983, co-inventor H. K. Liu of this application (and others) reported the development and fabrication of a multi-focus hololens using dichromated gelatin. A hololens, generally indicated as 38, is shown in simplified form in FIG. 3. It is characteristic of the hololens 38 that when a collimated beam of light 40 passes therethrough, a plurality of focal points 42 are created. It is important to recognize that each focal point 42 contains all the information from the collimated light beam 40. Thus, if the light beam 40 had a triangle such as object 10 impressed thereon (as by passing through a transparent filter containing such an object image) each focal point 42 would contain the image of the entire triangle. It is the incorporation of the hololens into the basic Vander Lugt filter apparatus of FIGS. 2A and 2B which makes the present invention possible.

The basic system of the present invention as employed for pre-establishing or pre-defining the objects to be recognized is shown in FIG. 4 wherein it is generally indicated as 44. A laser 46 is employed to produce a beam of coherent light 48. The beam 48 is passed through a beam splitter 24 to produce an object beam 26 and a reference beam 28. Each beam 26, 28 is passed through a beam expander 50 and a collimating lens 52 to produce expanded and collimated beams 26' and 28'. The reference beam 28' is reflected at 53 onto a transparent film 32 in the same manner as with the Vander Lugt filter of FIGS. 2A and 2B and for the same purpose. Note that for simplicity and convenience only, such terms as "film" and "development" are employed in this description and the claims which follow. As those skilled in the art will recognize, the creation of the transparent interference filters employed in the prior art Vander Lugt filter and this invention can be created by various technical processes which form no part of the points of novelty of the present invention. Simultaneously, a television camera 16 (preferably of the charge coupled device (CCD) variety for simplicity and smallness of size) is used to drive an LCTVSLM 54 disposed in the path of the object beam 26'. Thus, whatever is viewed by the camera 16 is impressed onto the object beam 26' by the LCTVSLM 54. Immediately following the LCTVSLM 54, the object beam 26' is low-pass filtered at 56 to remove the periodical spectrum pattern associated with the grid structure of the LCTVSLM 54. The filtered object beam 26' is then passed through a multiple-focus hololens 38 to create an N×N array of focal points 42 on the film 32. As described above with respect to the Vander Lugt filter, the interference pattern between the reference beam 28' and the multiple-focal points 42 creates an N×N array Fourier spectra of the input scene. Without more, the multi-point spatial filter created by development of the film 32 would be of no more use than the single point filter produced by the prior art. As shown in FIGS. 5(A)–5(D), however, during synthesis of multiple, matched, spatial filters (MSFs) on the film 32, the reference beam 28' is linearly shifted to spatially separate the output correlation planes associated with each MSF such that recognition and tracking of multiple objects can subsequently take place in real-time. By way of example, assume that the hololens 38 creates nine focal points 42 in a 3×3 matrix as shown in FIG. 5A. Assume for simplicity that three objects are to be recognized and tracked, the triangle 10, the circle 12, and a rectangle 58. Using the apparatus of FIG. 4, the triangle 10 is first placed within the viewing area of the television camera 16 while a shield 60 is placed over the unexposed film 32 covering all but one of the focal points 42. The laser 46 is then operated to expose the focal point 42 to be associated with the triangle 10 as shown in FIG. 5B. The process is then repeated as shown in FIG. 5C employing the rectangle 58 and a shield 60' exposing only another of the focal points 42 to be associated with the rectangle 58. Finally, as shown in FIG. 5D, the process is repeated once again with a third shield 60" exposing a third focal point 42 on the film 32 to be associated with the circle 12. For additional objects to be recognized, the process would be repeated in like fashion. Again, as those skilled in the art will appreciate, in a commercial embodiment of the present invention the shields 60, 60', 60" of the laboratory testing embodiment could be replaced by a liquid crystal matrix over the film used to block all the focal points but the particular one of interest at each instance employing dynamic optical techniques. For simplicity, a 3×3 or 9-focus hololens is employed in the example. A 25-focus hololens system has been demonstrated and the state of the art techniques available at present can increase the number up to 100. It is expected that in the future this number will increase dramatically.

Having thus created the array of prefabricated holographic matched spatial filters, real-time optical multiple object recognition and tracking is accomplished by the system 44' as shown in FIG. 6 wherein the prefabricated filter is indicated as 62. As the multiple objects 10, 12, 58 move within the field of vision of the television camera 16, their images are impressed on the object beam 26' by the LCTVSLM 54. The scene of the multiple objects is duplicated by the multiple focus hololens 38 at the nine focal points 42 with the image of "recognized" objects passing through the filter 62 at each object's associated focal point location. The output from the filter 62 is focused by lens 64 into a second television camera 16'. The output correlation peaks are picked up by the array of CCD detectors within the camera 16' for threshold detection. The level of light passage through each focal point 42 of the filter 62 can be analyzed and determined from the CCD outputs from the camera 16' by techniques well known to those skilled in the art. Obviously, objects within the field of view of the camera 16 (such as triangle 10, circle 12, and rectangle 58) having matched spatial filters within the filter 62 will pass their image through to the lens 64 and thence to the television camera 16'. Other objects within the field of view, having no matched filter, will produce no image. Thus, detection of an image passing through a given focal point 42 on the filter 62 above a threshold level (some light will pass through all points of the filter 62 even in a non-recognized state) indicates the associated object is present in the field of view. The image from "recognized" focal points can, of course, be used to track the associated object within the field of view as it is only of the recognized object. The combined image of multiple recognized objects can, of course, be formed, if desired, by re-focusing the multiple images at a single focal point.

In the laboratory experimental setup of the inventors herein, a Radio Shack ® liquid crystal television was disassembled and the screen thereof used for the LCTVSLM 54. Phase non-uniformity was eliminated by submerging the LCTVSLM into a liquid gate filled with insulating mineral oil. The critically important shift invariance was obtained satisfactorily in this manner. A 3×3 focus dichromated gelatin hololens was used and, for simplicity of demonstration, a column of three matched spatial filters were synthesized to track the motions of three independent objects. The matched spatial filters were recorded using a thermal plastic plate for high diffraction efficiency and ease in processing. In the experimental demonstrations, three different toy cars were selected as the input objects. The cars were photographed from above heading in 45° directions. The range of the television camera coverage was about 75°, however, the range of tracking of the input object was limited to about 30'. This is mainly because of the limited aperture size of the hololens (0.3 cm) as compared to the television screen size (5.4 cm by 4.4 cm). Employing the above-described apparatus, the inventors demonstrated the first known optical multiple object tracking system. The system is capable of simultaneous tracking of multiple objects, each with independent movements in real-time, limited only to the television frame rate (30 msec). In order to perform a similar tracking operation employing a digital computer, a large counter system and very complex software would be needed. Although the inventors have demonstrated the tracking of only three objects, the system capacity can easily be expanded by two orders of magnitude.

It should be recognized by those skilled in the art that in recognizing multiple "objects", the system and method of the present invention also provide the ability to recognize different orientations of a single object as depicted in FIGS. 7 and 7A–F. Such an ability could be used to good advantage, for example, in space applications such as the control of docking maneuvers, and the like. Thus, for example, the filter 62 can comprise multiple interference patterns at the focal points 42 corresponding to different orientations of the spacecraft 66. Thus, as passage of the beam 26' occurs through the focal point 42 labelled "B" and is sensed by the CCDs within the camera 16' in a manner well known to those skilled in the art, the system of the present invention recognizes that the spacecraft 66 is oriented with its nose directly at the camera 16. Employing the image passing through the "B" focal point of the filter 62, of course, the spacecraft 66 can be tracked within the field of vision of the camera 16 since the entire field of vision is contained within the beam 26' passing through that focal point 42 because of the characteristics of the hololens 38 as described previously herein. If the spacecraft 66 turns 180° and heads away from the camera 16, this, of course, will be recognized by the focal point 42 labelled "E" passing the beam 26' therethrough. All this could be performed optically with a minimum of equipment as compared to digital techniques, as is of prime importance in space applications.

We claim:
1. Apparatus for optically simultaneously recognizing a plurality of objects within a field of vision comprising:
   (a) a source of a coherent collimated light beam;
   (b) beam splitter means for splitting said light beam into an object beam and a reference beam;
   (c) two-dimensional spatial light modulation means disposed in said object beam for modulating said object beam with optical information as a function of signals connected to X and Y inputs thereof;
   (d) television camera means for developing X and Y signals reflecting the contents of its field of vision, said X and Y signals being connected to said X and Y inputs of said two-dimensional spatial light modulation means;
   (e) hololens means disposed in said object beam subsequent to said two-dimensional spatial light modulation means for focusing said object beam at a plurality of focal points;

(f) planar film means disposed with said focal points on an exposable surface thereof for forming a multiple position interference filter upon exposure of said exposable surface and subsequent development processing of said film means;

(g) means for directing said reference beam onto said exposable surface of said planar film means to expose said exposable surface in combination with images focused by said hololens means forming interference patterns on said exposable surface; and, (h) means for simultaneously sensing and indicating light passage through respective ones of the positions of said multiple position interference filter following development processing of said exposable surface whereby simultaneous recognition of objects corresponding to respective ones of said positions of said multiple position interference filter is affected.

2. The apparatus of claim 1 wherein:
said means for simultaneously sensing and indicating light passage through respective ones of the positions of said multiple position interference filter includes means for indicating light passage only if light passing therethrough is above a pre-established threshold level corresponding to object recognition.

3. The method of optically simultaneously recognizing individual pre-defined ones of a plurality of objects within a field of vision comprising the steps of:

(a) pre-defining the objects to be recognized by the steps of, (a1) providing a controlled source of a coherent collimated light beam and means for splitting the light beam into an object beam and a reference beam;

(a2) disposing a two-dimensional spatial light modulator in the path of the object beam to modulate the object beam with optical information as a function of signals connected to X and Y inputs thereof;

(a3) providing a television camera to develop X and Y signals reflecting the contents of its field of vision;

(a4) connecting the X and Y signals to the X and Y inputs of the two-dimensional spatial light modulator;

(a5) disposing a hololens in the path of the object beam subsequent to the two-dimensional spatial light modulator to focus the object beam at a plurality of focal points in a plane;

(a6) disposing unexposed transparency-forming film with an exposable surface thereof in the plane of the focal points;

(a7) providing means for directing the reference beam onto the exposable surface of the film to expose the exposable surface in combination with images focused by the hololens forming interference patterns on the exposable surface;

(a8) placing an object to be recognized within the field of vision of the television camera;

(a9) covering the exposable surface of the film except for one focal point location thereof;

(a10) turning on the coherent collimated light beam to expose the exposable surface of the film at the one exposed focal point location;

(a11) repeating steps (a8) through (a10) with different objects and focal point locations to expose points of a multiple position interference filter;

(a12) development processing the film to form the multiple position interference filter; and thereafter, (b) subsequently simultaneously recognizing the objects by the steps of, (b1) disposing the multiple position interference filter with the points thereof in the plane of the focal points;

(b2) operatively positioning means for simultaneously sensing and indicating light passage through respective ones of the positions of the multiple position interference filter;

(b3) directing the field of vision of the television camera on an area containing objects to be recognized;

(b4) turning on the coherent collimated light beam to create only the object beam with the contents of the field of vision of the television camera dynamically impressed on the object beam by the two-dimensional spatial light modulator; and, (b5) monitoring the simultaneous sensing and indicating means for indications of light passage through ones of the positions of the multiple position interference filter whereby simultaneous recognition of objects corresponding to respective ones of the pre-defined positions of the multiple position interference filter is affected.

4. The method of claim 3 wherein:
said step of monitoring the simultaneous sensing and indicating means for indications of light passage through ones of the positions of the multiple position interference filter includes the step of indicating light passage only if light passing through a position is above a pre-established threshold level corresponding to object recognition.

5. The method of claim 4 and additionally comprising the step for tracking the objects of:
focusing light passing through positions above said pre-established threshold level onto a charge coupled device to create a two-dimensional image of the field of view of the television camera and the recognized objects therein whereby movement of the objects can be seen and visually tracked.

6. Apparatus for optically simultaneously recognizing a plurality of objects within a field of vision comprising:

(a) a laser producing a coherent laser beam;

(b) beam expanders and collimators positioned to transform said object beam and said reference beam into coherent collimated light beams;

(c) a beam splitter disposed to split said laser beam into an object beam and a reference beam;

(d) a two-dimensional spatial light modulator disposed in said object beam to modulate said object beam with optical information as a function of signals connected to X and Y inputs thereof;

(e) a first television camera for developing X and Y signals reflecting the contents of its field of vision, said X and Y signals being connected to said X and Y inputs of said two-dimensional spatial light modulator;

(f) a hololens positioned in said object beam subsequent to said two-dimensional spatial light modulator to focus said object beam at a plurality of focal points;

(g) a planar transparency-forming film disposed with said focal points on an exposable surface thereof to form a multiple position interference filter upon exposure of said exposable surface and subsequent development processing of said film;

(h) means for directing said reference beam onto said exposable surface of said film to expose said exposable surface in combination with images focused by said hololens to form interference patterns on said exposable surface; and, (i) means for simultaneously sensing and indicating light passage through respective ones of the positions of said multiple position interference filter following development processing of said exposable surface whereby simultaneous recognition of objects corresponding to respective ones of said positions of said multiple position interference filter is affected.

7. The apparatus of claim 6 wherein:
said means for simultaneously sensing and indicating light passage through respective ones of the positions of said multiple position interference filter includes a second television camera containing a matrix of charge coupled devices and means for focusing light passing through said interference filter onto said matrix.

8. The apparatus of claim 7 wherein:
said means for simultaneously sensing and indicating light passage through respective ones of the positions of said multiple position interference filter employs outputs of the charge coupled devices to indicate light passage at each position of the interference filter and includes means for indicating light passage only if light passing through a position is above a pre-established threshold level corresponding to object recognition.

9. The method of optically recognizing individual pre-defined ones of a plurality of possible orientations of an object within a field of vision without the necessity of including a step for sequentially comparing to a series of pre-defined position definitions comprising the steps of:

(a) pre-defining the orientations of the object to be recognized by the steps of, (a1) providing a controlled source of a coherent collimated light beam and means for splitting the light beam into an object beam and a reference beam;

(a2) disposing a two-dimensional spatial light modulator in the path of the object beam to modulate the object beam with optical information as a function of signals connected to X and Y inputs thereof;

(a3) providing a television camera to develop X and Y signals reflecting the contents of its field of vision;

(a4) connecting the X and Y signals to the X and Y inputs of the two-dimensional spatial light modulator;

(a5) disposing a hololens in the path of the object beam subsequent to the two-dimensional spatial light modulator to focus the object beam at a plurality of focal points in a plane;

(a6) disposing unexposed transparency-forming film with an exposable surface thereof in the plane of the focal points;

(a7) providing means for directing the reference beam onto the exposable surface of the film to expose the exposable surface in combination with images focused by the hololens forming interference patterns on the exposable surface;

(a8) placing the object within the field of vision of the television camera in a first orientation to be recognized;

(a9) covering the exposable surface of the film except for one focal point location thereof;

(a10) turning on the coherent collimated light beam to expose the exposable surface of the film at the one exposed focal point location;

(a11) repeating steps (a8) through (a10) with different orientations and focal point locations to expose points of a multiple position interference filter;

(a12) development processing the film to form the multiple position interference filter; and thereafter, (b) subsequently recognizing the orientation of the object by the steps of, (b1) disposing the multiple position interference filter with the points thereof in the plane of the focal points;

(b2) operatively positioning means for sensing and indicating light passage through respective ones of the positions of the multiple position interference filter;

(b3) directing the field of vision of the television camera on an area containing the object;

(b4) turning on the coherent collimated light beam to create only the object beam with the contents of the field of vision of the television camera dynamically impressed on the object beam by the two-dimensional spatial light modulator; and (b5) simultaneously monitoring said sensing and indicating means for indications of light passage through ones of the positions of the multiple position interference filter whereby instant recognition of the orientation of the object corresponding to respective ones of the pre-defined positions of the multiple position interference filter is affected.

10. The method of claim 9 wherein:
said step of simultaneously monitoring said sensing and indicating means for indications of light passage through ones of the positions of the multiple position interference filter includes the step of indicating light passage only if light passing through a position is above a pre-established threshold level corresponding to object orientation recognition.

11. The method of claim 10 and additionally comprising the step for tracking the object of:
focusing light passing through a position above said pre-established threshold level onto a charge coupled device to create a two-dimensional image of the field of view of the television camera and the object therein whereby movement of the object can be seen and visually tracked.

12. Apparatus for optically simultaneously recognizing a plurality of objects within a field of vision comprising:

(a) a laser producing a coherent laser beam;

(b) a beam splitter disposed to split said laser beam into an object beam and a reference beam;

(c) beam expanders and collimators positioned to transform said object beam and said reference beam into coherent collimated light beams;

(d) a two-dimensional spatial light modulator disposed in said object beam to modulate said object beam with optical information as a function of signals connected to X and Y inputs thereof;

(e) a first television camera for developing X and Y signals reflecting the contents of its field of vision, said X and Y signals being connected to said X and Y inputs of said two-dimensional spatial light modulator;

(f) a hololens positioned in said object beam subsequent to said two-dimensional spatial light modulator to focus said object beam at a plurality of focal points;

(g) a planar transparency-forming film disposed with said focal points on an exposable surface thereof to form a multiple position interference filter upon exposure of said exposable surface and subsequent development processing of said film;

(h) means for directing said reference beam onto said exposable surface of said film to expose said exposable surface in combination with images focused by said hololens to form interference patterns on said exposable surface; and, (i) means for simultaneously sensing indicating light passage through respective ones of the positions of said multiple position interference filter following development processing of said exposable surface whereby simultaneously recognition of objects corresponding to respective ones of said positions of said multiple position interference filter is affected.

13. The apparatus of claim 12 wherein:
said means for simultaneously sensing and indicating light passage through respective ones of the positions of said multiple position interference filter includes a second television camera containing a matrix of charge coupled devices and means for focusing light passing through said interference filter onto said matrix.

14. The apparatus of claim 13 wherein:
said means for simultaneously sensing and indicating light passage through respective ones of the positions of said multiple position interference filter employs outputs of the charge coupled devices to indicate light passage at each position of the interference filter and includes means for indicating light passage only if light passing through a position is above a pre-established threshold level corresponding to object recognition.

15. In Vander Lugt filter type apparatus for optically recognizing an object within a field of vision including a source of a coherent light beam; a beam splitter disposed to split the light beam into an object beam and a reference beam; beam expanders and collimators positioned to transform the object beam and the reference beam into coherent collimated light beams; a transparency-forming film disposed form an interference filter upon exposure of said exposable surface and subsequent development processing of the film; means for directing the reference beam onto the exposable surface of the film to expose the exposable surface in combination with an image focused to form an interference pattern on the exposable surface; and, means for sensing and indicating light passage through the interference pattern position of the interference filter following development processing of the exposable surface whereby recognition of an object corresponding to the one used to create the interference filter is affected, the improvement to allow simultaneous recognition of multiple objects within the field of vision comprising:

(a) two-dimensional spatial light modulator disposed in the object beam to modulate the object beam with optical information as a function of signals connected to X and Y inputs thereof;

(b) a first television camera for developing X and Y signals reflecting the contents of its field of vision, said X and Y signals being connected to said X and Y inputs of said two-dimensional spatial light modulator;

(c) a hololens positioned in the object beam subsequent to said two-dimensional spatial light modulator to focus the object beam at a plurality of focal points;

(d) means for positioning the transparency-forming film with said focal points on an exposable surface thereof to form a multiple position interference filter upon exposure of said exposable surface and subsequent development processing of said film;

(e) the means for directing said reference beam onto said exposable surface of said film including means to expose said exposable surface in combination with multiple images focused by said hololens to form a plurality of interference patterns on said exposable surface; and, (f) the means for sensing and indicating light passage including means for simultaneously sensing and indicating light passage through respective ones of the positions of said multiple position interference filter following development processing of said exposable surface whereby simultaneous recognition of objects corresponding to respective ones of said positions of said multiple position interference filter is affected.

16. The improvement of claim 15 wherein:
said means for simultaneously sensing and indicating light passage through respective ones of the positions of said multiple position interference filter includes a second television camera containing a matrix of charge coupled devices and means for focusing light passing through said interference filter onto said matrix whereby light passage through individual positions of said interference filter can be determined by the presence of light at corresponding positions of said matrix.

17. The apparatus of claim 16 wherein:
said means for simultaneously sensing indicating light passage through respective ones of the positions of said multiple position interference filter employs outputs of the charge coupled devices to indicate light passage at each position of the interference filter and includes means for indicating light passage only if light passing through a position is above a pre-established threshold level corresponding to object recognition.

18. The improvement of claim 15 wherein:
said means for simultaneously sensing and indicating light passage through respective ones of the positions of said multiple position interference filter includes a second television camera containing a matrix of charge coupled devices and means for focusing light passing through at least one position of said interference filter onto said matrix to create a two-dimensional image of the field of view of the first television camera and the objects therein for use in visually tracking movement of the objects.

* * * * *